United States Patent [19]
Murata

[11] Patent Number: 5,511,644
[45] Date of Patent: Apr. 30, 1996

[54] FRICTIONAL ENGAGEMENT DEVICE FOR AN AUTOMATIC TRANSMISSION

[75] Inventor: Kiyohito Murata, Susono, Japan

[73] Assignee: Toyota Jidosha Kabushiki Kaisha, Toyota, Japan

[21] Appl. No.: 282,441

[22] Filed: Jul. 29, 1994

[30] Foreign Application Priority Data

Aug. 24, 1993 [JP] Japan ..................... 5-209471

[51] Int. Cl.$^6$ ........................ F16D 25/0638; F16H 3/44
[52] U.S. Cl. .................. 192/85 AA; 192/109 F; 475/125; 475/146
[58] Field of Search .......... 192/85 AA, 70.21, 192/54, 56 F, 83, 109 F; 475/146, 148, 125, 126

[56] References Cited

U.S. PATENT DOCUMENTS

| | | | |
|---|---|---|---|
| 3,650,364 | 3/1972 | Laing | 192/109 F X |
| 3,690,429 | 9/1972 | Honda. | |
| 4,083,442 | 4/1978 | Ushijima | 192/56 F X |
| 4,957,195 | 9/1990 | Kano et al. | 192/87.1 X |
| 5,106,348 | 4/1992 | Koivunen | 192/85 AA X |
| 5,232,411 | 8/1993 | Hayashi et al. | 475/146 |

FOREIGN PATENT DOCUMENTS

| | | |
|---|---|---|
| 2016712 | 10/1971 | Germany. |
| 3819702 | 12/1989 | Germany. |
| 3-181620 | 8/1991 | Japan. |

OTHER PUBLICATIONS

SAE Paper 930911, pp. 181–194. "The Multi-Mode Clutch-A New Technology for Freewheeler Shifting Automatic Transmissions"; Koivunen, Erkki A., et al.

Primary Examiner—Rodney H. Bonck
Attorney, Agent, or Firm—Oblon, Spivak, McClelland, Maier & Neustadt

[57] ABSTRACT

A frictional engagement device for an automatic transmission, by which an input shaft and an output shaft are engaged or disengaged by use of oil pressure. A casing connected to an input shaft and a first piston disposed in the casing define a first oil pressure chamber. The first piston is rotationally movable by predetermined angle and is axially movable by predetermined distance relative to the casing. A second piston disposed in the first piston defines a second oil pressure chamber with the first piston, and the second piston is axially movable relative to the first piston. Separator plates axially slidably connected to the first piston and clutch discs axially slidably connected to a hub which is fixedly connected to the output shaft are engaged by a displacement of the second piston by supplying pressurized oil to the second oil pressure chamber and/or to the first oil pressure chamber. The oil passages in the casing and the first piston connect to each other when one of them rotationally moves relative to the other after the first piston is displaced with supplying pressurized oil to the first oil pressure chamber. The pressurized oil supplied to the first oil pressure chamber is then discharged and the engagement is released.

8 Claims, 5 Drawing Sheets

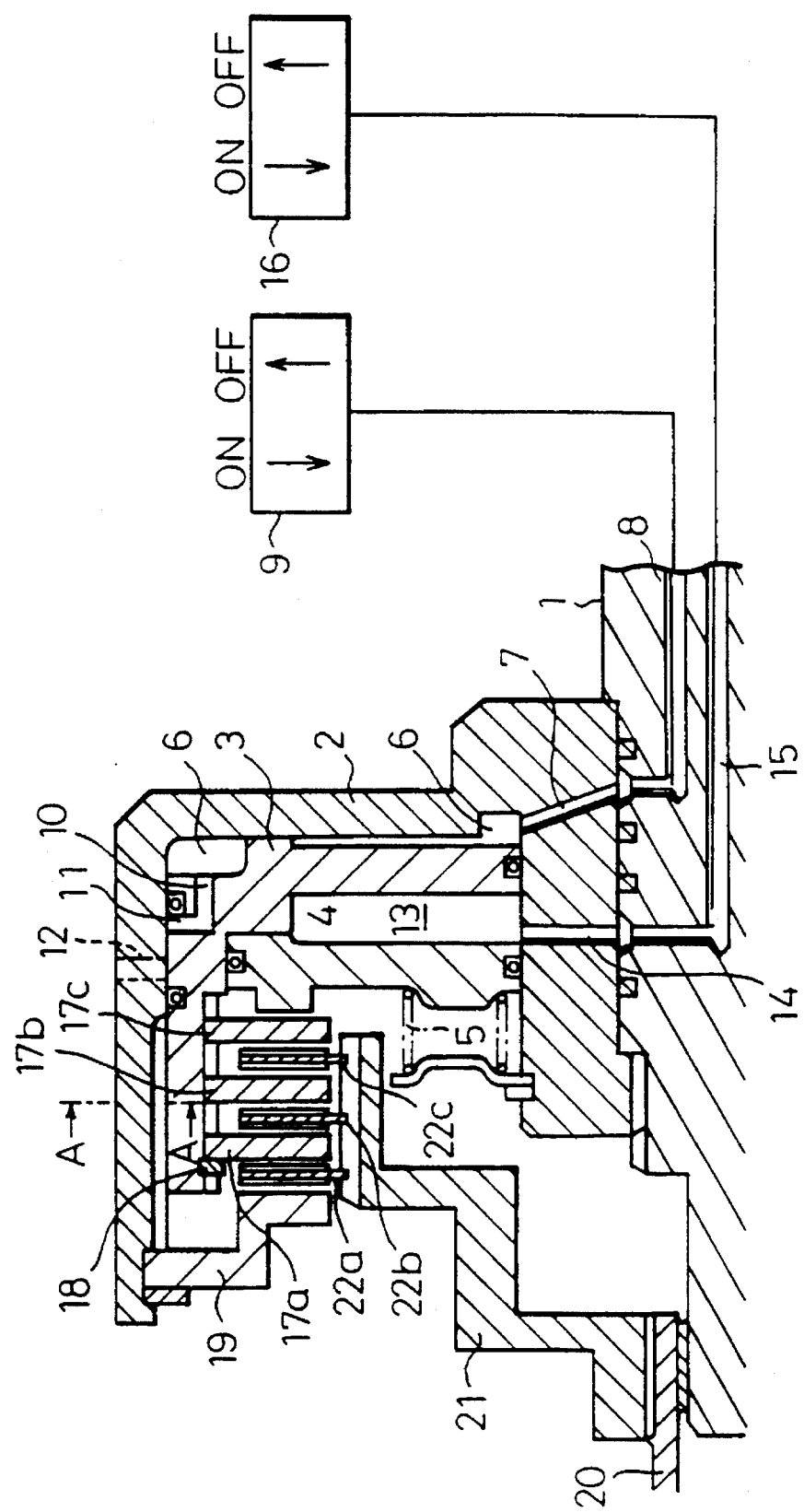

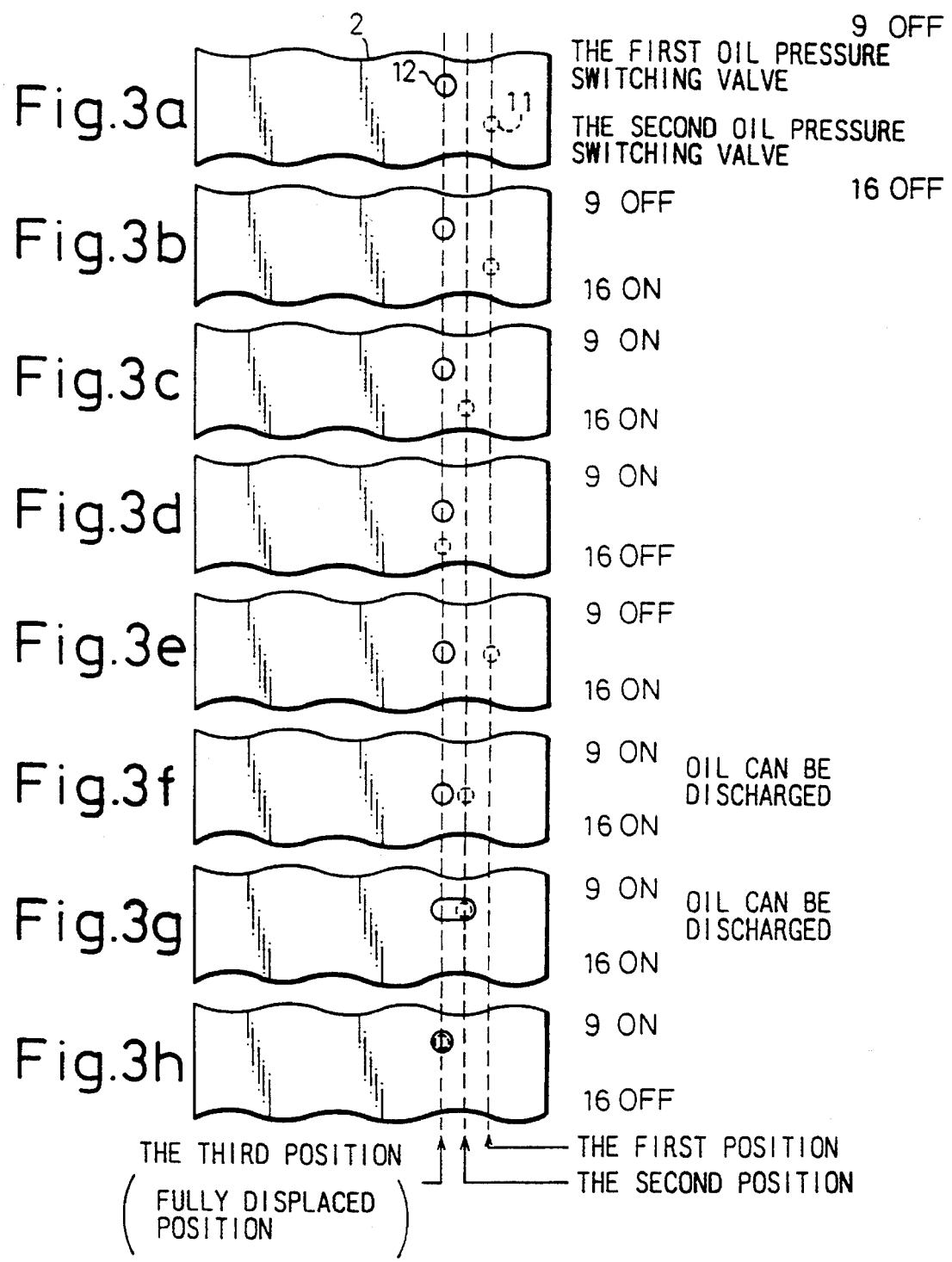

Fig. 4

| | CASE 1 | CASE 2 | CASE 3 | CASE 4 |
|---|---|---|---|---|
| FIRST OIL PRESSURE SWITCHING VALVE | OFF | ON | ON | OFF |
| SECOND OIL PRESSURE SWITCHING VALVE | ON | ON | OFF | OFF |
| OPERATION | · SECOND PISTON DISPLACED<br>· CLUTCH DISCS AND SEPERATOR PLATES ARE PARTIALLY ENGAGED | · FIRST PISTON DISPLACED<br>· CLUTCH DISCS AND SEPERATOR PLATES ARE FULLY ENGAGED | · SECOND PISTON RELEASED<br>· FIRST PISTON IS FULLY DISPLACED | · FIRST PISTON RELEASED<br>· SECOND PISTON RELEASED |
| ENGAGE CONDITION | LESS STRONG | STRONG | ONE-WAY CLUTCH | — |
| CAPACITY | SMALL | LARGE | LARGE | — |
| PURPOSE | SMOOTH SHIFTING | KEEPING GEAR SPEED | SMOOTH SHIFTING | GETTING CUT OFF CONDITION |
| DRIVE FROM INPUT | POSSIBLE | POSSIBLE | POSSIBLE | IMPOSSIBLE |
| DRIVE FROM OUTPUT | POSSIBLE | POSSIBLE | IMPOSSIBLE | IMPOSSIBLE |

FRICTIONAL ENGAGEMENT DEVICE FOR AN AUTOMATIC TRANSMISSION

BACKGROUND OF THE INVENTION

1. Field of the Invention

The present invention relates to a frictional engagement device for an automatic transmission, especially for an automatic transmission used in an automobile that engages and disengages two members to change the route of transmitting torque in an automatic transmission, so that gear ratio is changed.

2. Description of the Related Art

Generally an automatic transmission used in an automobile has one or more planetary gearsets between an input shaft which is connected to a torque converter and an output shaft which is connected to a propeller shaft or an axle shaft. Each planetary gearset has three elements, i.e. a ring gear, a sun gear and a planet-pinion carrier assembly. Gear shifts are made by changing the engagement of an element used in each planetary gearset by means of a frictional engagement device.

Suppose a shift is made by changing the engagement of one element PGIa in planetary gearset PGI which is disposed in the input side and one element PGOa in planetary gearset PGO which is disposed in the output side. Suppose more specifically, the shift is made from one gear speed (hereinafter called the first gear speed) in which element PGIa is rotating and element PGOa is not rotating, to the next gear speed (hereinafter called the second gear speed) in which element PGIa in planetary gearset PGI and element PGOa in planetary gearset PGO are both rotating while engaged with each other, and to the next but one gear speed (hereinafter called the third gear speed) in which element PGIa is not rotating and element PGOa is rotating.

The frictional engagement device disposed between the PGIa and PGOa is required to operate as follows:

(1) To make it possible to shift smoothly from the first gear speed to the second gear speed, the device gradually engages the element PGIa in planetary gearset PGI which is in a rotating condition and element PGOa which is in a stationary condition so that transfer element PGOa from a stationary condition to rotating condition;

(2) To make it possible to keep the second gear speed, the device holds the engaged condition;

(3) To make it possible to drive in engine brake condition, the device transmits a torque from the element PGOa to the element PGIa;

(4) To make it possible to shift smoothly from the second gear speed to the third gear speed, the device disengages at once when the element PGIa in planetary gearset PGI in rotating condition is stopped so that prevent the element PGOa from suffering the force of stopping; and (5) To make it possible to have no transmitting condition, the device holds the disengaged condition.

To complete all the above listed operations, systems having two frictional engagement device and one one-way clutch device has been generally used. Because one frictional engagement device is required for the operations of (1), (2), (5) and one one-way clutch is required for (4), and another frictional engagement device is required for (3) due to the use of the one-way clutch device.

Practically, a multi-plate wet type clutch is used for frictional engagement device and a sprag type or a roller type one-way clutch is used for one-way clutch device.

FIG. 5 is a schematic view of a system having the devices described above.

In FIG. 5, casing 30 is connected to an input shaft 31. The input shaft 31 is connected to an element PGIa (not shown) in a planetary gear-set PGI (not shown) at the right (in FIG. 5) end of the input shaft(not shown). First separator plates 32 are slidably connected to the casing 30 at the inner peripheral surface thereon by means of splines or the like. The casing 30 defines a first oil pressure chamber 33 with a first piston 35.

When pressurized oil is supplied to the oil pressure chamber 33 through a oil passage 34 and the first piston 35 is displaced to the left (in FIG. 5), the first separator plates 32 are engaged with a first clutch discs 36. The first clutch discs 36 are connected to a first clutch drum 37 by means of splines or the like. The first clutch drum 37 is connected to an output shaft 39 through a one-way clutch 38. Said output shaft 39 is connected to PGOa (not shown) which is one element of planetary gear-set PGO (not shown) at the left (in FIG. 5) end of the output shaft (not shown).

Second separator plates 40 are slidably connected to the casing 30 at the inner peripheral surface thereon by means of splines or the like. The casing 30 defines a second oil pressure chamber 41 with a second piston 43. When pressurized oil is supplied to a second oil pressure chamber 41 through a oil passage 42 and a second piston 43 is displaced to the right (in FIG. 5), the second separator plates 40 are engaged with a second clutch discs 44. The second clutch discs 44 are slidably connected to a second clutch drum 45 by means of splines or the like. The second clutch drum 45 is fixedly connected to the output shaft 39.

The first piston 35 and the second piston 44 are respectively urged by springs 46 in the direction of disengagement. Check balls 47 facilitate the movement of the first piston 35 and the second piston 44 in the direction of disengagement. O-rings 48 prevent oil leaking from the first oil pressure chamber 33 and second oil pressure chamber 41.

In the above described system the required operations previously described are completed as follows:

The required operation (1) is completed by supplying pressurized oil to the first oil pressure chamber 33 through the oil passage 34. The force generated by oil pressure overcomes the force generated by the spring 46. The first piston 35 is then displaced to the left (in FIG. 5) and pushes the first separator plates 32 against the first clutch discs 36 so that they are engaged with each others. Said first clutch discs 36 are connected to the first clutch drum 37. Said one-way clutch 38, between the first clutch drum 37 and the output shaft 39, is so constructed that it transmits torque from the input shaft when the input shaft moves in a clockwise direction (as viewed from the direction of arrow A), for instance. Thus rotational torque from the input shaft 31 is transmitted to the output shaft 39, and the output shaft 39 rotates;

The required operation (2) is completed by keeping the pressure of the first oil pressure chamber 33 sufficient to overcome the force of spring 46;

The required operation (3) is completed by supplying pressurized oil to the second oil pressure chamber 41 through the oil passage 42 so that the second clutch discs 44 and second separator plates 40 are engaged. Torque from output shaft is then transmitted to input shaft, because the second clutch discs 44 are connected to the second clutch drum 45 which are fixedly connected to the output shaft 39, and the second separator plates 40 are connected to the casing 30 which is connected to the input shaft 31.

The required operation (4) is completed, automatically, by keeping the pressure of the first oil pressure chamber 33 sufficient to overcome the force of spring 46, and by setting the pressure in the second oil pressure chamber 41 to zero. Then the one-way clutch 38 frees the output shaft 39 from the input shaft 31 when the input shaft 31 is stopped; and The required operation (5) is completed by supplying pressurized oil to neither the first oil pressure chamber 33 nor to the second oil pressure chamber 41.

By the way, a transmission is one of the heaviest and largest components in an automobile like, and the recent demand for lower emission and lower fuel consumption from automobile means that small, light transmissions are required. The above requirement is especially true in the case of automatic transmission, because automatic transmissions are generally heavier, and the amount produced is much higher.

Therefore, many kinds of small, light automatic transmissions have been proposed. For example, an automatic transmission without a one-way clutch of the sprag or roller type is disclosed by Japanese Unexamined Patent Publication No. 3-181620. Instead of a one-way clutch of the sprag or roller type, the automatic transmission has an oil outlet with a variable aperture to discharge pressurized oil which generates a force to engage an element connected to an input member with an element connected to an output member. The aperture of the oil outlet varies depending on the relative rotational position of the above two members. Oil is discharged when the input shaft is stopped, and then the above two elements are disengaged and the output member becomes free from the input member. Thus, the variable oil outlet operates as a one-way clutch of the sprag or roller type.

Therefore, the automatic transmission described above requires two clutch devices to make it possible to drive the vehicle with engine braking. Accordingly, said type automatic transmission requires space for two clutch devices, even though it can save the space required for installing a one-way clutch of the sprag or roller type.

SUMMARY OF THE INVENTION

In view of the problem of the related art, the object of the present invention is to provide a frictional engagement device which allows a light, small automatic transmission to be constructed.

According to the present invention, there is provided a frictional engagement device for an automatic transmission for engaging and disengaging a first member and a second member by use of oil pressure, the frictional engagement device comprising: a casing connected to the first member and having at least one first oil passage; a first piston means disposed in the casing and having at least one second oil passage, the first piston means defining a first oil pressure chamber together with the casing, the second oil passage being connected to the first oil pressure chamber, the first piston means being axially movable relative to the casing by a predetermined distance by supplying pressurized oil into the first oil pressure chamber, and one of the first piston means and the casing being rotationally movable relative to the other by a predetermined angle; a second piston means disposed in the first piston means, the second piston means defining a second oil pressure chamber together with the first piston means, the second piston means being axially movable relative to the first piston means by supplying pressurized oil into the second oil pressure chamber; first group of frictional engagement elements being axially spaced and axially slidably connected to the first piston means; and second group of frictional engagement elements being axially spaced and axially slidably connected to the second member, the second groups of frictional engagement elements facing the first groups of frictional engagement elements respectively, wherein the second piston means pushes one of the first group of frictional engagement elements and the second group of frictional engagement elements when the second piston means is axially moved by supplying pressurized oil into at least one of the first oil pressure chamber and the second oil pressure chamber, wherein the first oil passage in the casing is connected to the second oil passage in the first piston means and pressurized oil supplied in the first oil pressure chamber can be discharged when one of the casing and the first piston means rotationally moves relative to the other after the first piston means is axially moved.

BRIEF DESCRIPTION OF THE DRAWINGS

The present invention will be better understood from the description as set forth hereafter, with reference to the accompanying drawings, in which:

FIG. 1 is a longitudinal cross-section showing an embodiment of a frictional engagement device of the present invention;

FIG. 3a to 3h are partial top views showing relative positions of the oil passages in the casing and first piston; and FIG. 4 is a table summarizing the operations and states and purpose of the frictional engagement device depending on the position of the first and second oil pressure switching valves.

DESCRIPTION OF THE PREFERRED EMBODIMENTS

Figure 2A:
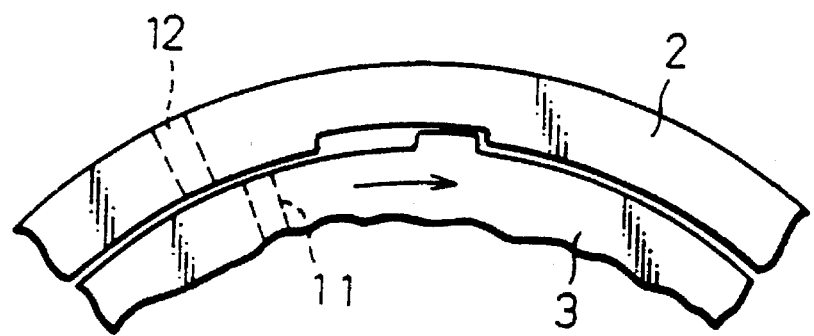
FIG. 2a to 2b are partial longitudinal views taken along the line A—A of FIG. 1 showing relative positions of oil passages in the casing and first piston.

Referring now to the drawings in detail, there is shown in FIG. 1 an longitudinal cross-section of an embodiment of a frictional engagement device of the present invention. In FIG. 1, input shaft 1 is connected to an element PGIa (not shown) in a planetary gear-set PGI (not shown) at the right (in FIG. 1) end of the input shaft (not shown). A casing 2 is fixedly connected to input shaft 1.

A first piston 3 is disposed in the casing 2 and is rotationally movable by predetermined angle, and axially movable by predetermined distance, relative to the casing 2. A second piston 4 is disposed in the first piston 3 and is axially movable by predetermined distance relative to the first piston 3. Return spring 5 urges the first piston 3 and second piston 4 to the right(in FIG. 1).

A first oil pressure chamber 6 is defined by the casing 2 and the first piston 3 and connected to a first oil pressure switching valve 9, through a oil passage 7 disposed in the casing 2 and oil passage 8 disposed in the input shaft 1 at a radially inner side, and also connected to oil passages 10 and 11 disposed in the first piston 3 at a radially outer portion.

The oil passage 11 is so disposed that it connects to oil passage 12 disposed in the casing 2 when the first piston 3 is stopped.

A second oil pressure chamber 13 is defined by the first piston 3 and the second piston 4, and connected to a second oil pressure switching valve 16 through an oil passage 14 disposed in the casing 14 and an oil passage 15 disposed in the input shaft 1, at the radially inner side.

Separator plates 17a, 17b, 17c are connected to the inner peripheral wall of the first piston 3 in an axially slidable relationship.

Stopper 18 is fixed to the first piston 3 to prevent the separator plate 17a from engaging with a clutch disc 22a when pressurized oil is supplied only to the second oil pressure chamber 13.

Stopper 19 is fixed to the casing 1 to limit the movement of clutch disc 22a when pressurized oil is supplied to the first oil pressure chamber 6.

A output shaft 20 is connected to an element PGOa (not shown) in a planetary gear-set PGO (not shown) at the left(in FIG. 1) end of the output shaft 20 (not shown). A hub 21 is fixedly connected to output shaft 20. Clutch discs 22a, 22b, 22c are connected to the outer peripheral wall of the hub 21 in an axially slidable relationship.

Now, it will be shown that the required operation, as previously discussed, can be completed.

As previously supposed in the prior art, shift is made by changing the engagement of one element PGIa in planetary gearset PGI which is disposed in the input side and one element PGOa in planetary gearset PGO which is disposed in the output side. Suppose, more specifically, that said shift is made from one gear speed (the first gear speed) in which element PGIa is rotating and element PGOa is not rotating, to the next gear speed (the second gear speed) in which element PGIa and element PGOa are both rotating while being engaged to each other, and to the next gear speed (the third gear speed) in which element PGIa is not rotating and element PGOa is rotating.

The frictional engagement device disposed between the PGIa and PGOa is required to operate as follows:

(1) To make it possible to shift smoothly from the first gear speed to the second gear speed, the device gradually engage the element PGIa which is in rotating condition and element PGOa which is in stationary condition so that transfer element PGOa from stationary condition to rotating condition;

(2) To make it possible to keep the second gear speed, the device holds the engaged condition;

(3) To make it possible to drive in engine brake condition, the device transmits a torque from the element PGOa to the element PGIa;

(4) To make it possible to shift smoothly from the second gear speed to the third gear speed, the device disengages at once when the element PGIa in rotating condition is stopped to prevent the element PGOa from suffering the force of stopping; and (5) To make it possible to have no transmitting condition, the device holds the disengaged condition.

The required operation (1) is completed by switching ON the second oil pressure switching valve 16. Pressurized oil is then supplied to the second oil pressure chamber 13, through the oil passages 15 and 14.

The second piston 4 is thereby displaced to the left (in FIG. 1), and the separator plates 17a, 17b, 17c are engaged with clutch discs 22b, 22c. Thus, torque from input shaft 1 is transmitted to output shaft 20. In this case, the engaging force is not strong, because clutch disc 22a is not engaged.

The relative positions of the oil passage 11 of the first piston 3 and the oil passage 12 of the casing 2 are shown in FIG. 3b which shows the passage holes in the same position as FIG. 3a, and shows the condition when pressurized oil is supplied. The axial view of the above condition is shown in FIG. 2a.

The required operation (2) is completed by switching the first oil pressure switching valve 9 ON and keeping the second oil pressure switching valve 16 switched ON. Then, pressurized oil is supplied to the first oil pressure chamber 6 through the oil passages 8 and 7. The first piston 3 is thereby displaced to the left (in FIG. 1), while holding the second piston 4 therein, and the separator plates 17a, 17b, 17c are engaged with clutch discs 22b, 22c and 22a. In this case, the engaging force is strong, because all the clutch discs and all the separator plates are engaged.

The relative positions of the oil passage 11 of the first piston 3 and the oil passage 12 of the casing 2 are shown in FIG. 3c in which the oil passage 11 of the first piston 3 is at the second position, and more to the left (in FIG. 1) compared with the case of FIG. 3a or 3b. However, the first piston 3 does not reach the fully displaced position, because the second oil pressure chamber 13 is kept filled with pressurized oil.

The axial view of the above condition is shown in FIG. 2a.

The required operation (3) is completed by keeping both the first oil pressure switching valve 9 and the second oil pressure switching valve 16 ON, as described below.

Figure 2B:
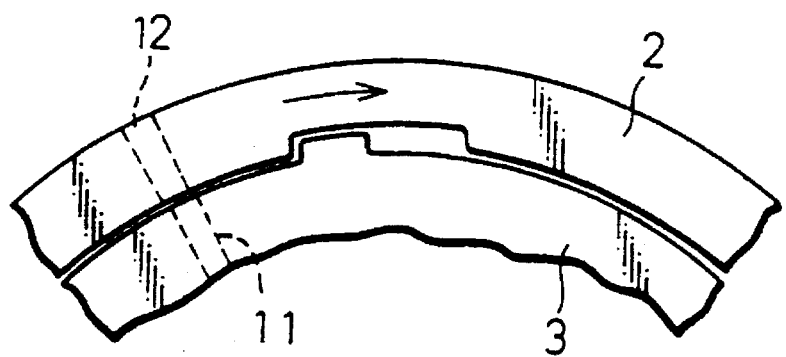
Figure 5:
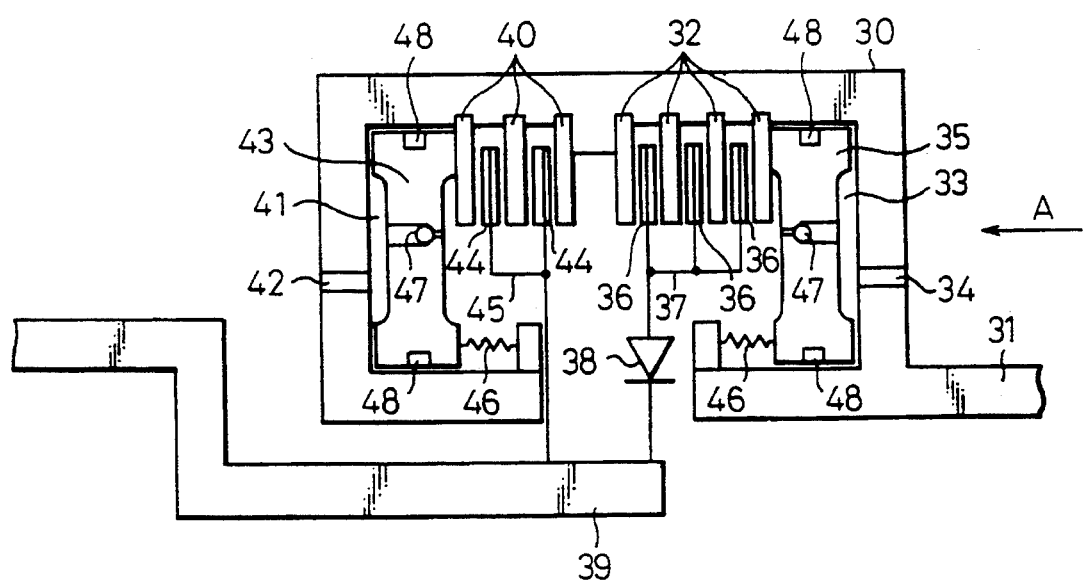
FIG. 5 is a schematic view of a frictional engagement device of a prior art.

In the engine braking driving condition, the output shaft is braked by the input shaft, or, from another point of view, the input shaft is driven by the output shaft. The axial view of this condition is shown in FIG. 2b. As shown in FIG. 2b, the rotational position of the oil passage 11 of the first piston 3 and oil passage 12 of the casing 2 coincide with each other.

Therefore, if the axial positions of the oil passages also coincide with each other, the pressurized oil in the first oil pressure chamber 6 is discharged, and the force which pushes the second piston 4 to the left (in FIG. 1) will disappear. Thus, the clutch disc 22a will become free and the force of engagement will become less strong.

Conversely, if the axial positions of the oil passages do not coincide with each other, the pressurized oil both in the first oil pressure chamber and in the second oil pressure chamber is not discharged, and the force of engagement is kept high, because all clutch discs and separator plates are engaged.

Accordingly, if the oil passage 11 of the first piston 3 and the oil passage 12 of casing 2 are so disposed that their axial positions coincide and the pressurized oil in the first oil pressure chamber can be discharged only when the first piston 3 is fully displaced (see FIG. 3h), engine braking conditions with strong (see FIG. 3f) and less strong engagement (see FIG. 3e) are both attainable.

If, one of the two oil passages 11 and 12 is longer in the axial direction (see FIG. 3g) so that the pressurized oil in the first oil pressure chamber can be discharged before the first piston 3 fully displaced, only engine braking conditions with less strong engagement is attainable.

The required operation (4) is completed by changing the second oil pressure switching valve 16 from ON to OFF, while keeping the first oil pressure switching valve 9 ON. The pressurized oil in the second oil pressure chamber 13 is then discharged, the first piston 3 is kept in the fully displaced position, and the axial position of the first piston 3 is coincides with the position of the casing 2, as shown in FIG. 3d. The second piston 4 is forced to the left (in FIG. 1)

only by the force generated by the oil pressure in the first oil chamber 6 through the first piston 3, therefore if the pressurized oil in the first oil pressure chamber is discharged, the second piston 4 can be displaced to the right (in FIG. 1) with the first piston 3 by the force of the spring 5.

Hereupon, if a force is applied to the input shaft 3 in some way (not shown) to stop the rotation, the output shaft 20 is braked by the input shaft 1, or input shaft 1 is driven by the output shaft 20, same as described with respect to the operation (3), and the rotational position of the oil passages in the casing 2 and the first piston 3 coincide with each other, thereby these passages are connected to each other and the pressurized oil in the first oil pressure chamber 6 is discharged. Then the force generated by the pressurized oil in the first oil pressure chamber 6 disappears and the first piston 3 and the second piston 4 are displaced to the right by the force of spring 5, and the separator plates and the clutch discs are disengaged.

Thus, the force applied to the input shaft 3 to stop the rotation is cut off before being transmitted to the output shaft 20, does not interfere with the rotation of the output shaft 20 and allows the gear shift to be smoothly performed.

The required operation (5) is completed by keeping the first oil pressure switching valve 9 and the second oil pressure switching valve 16 in the OFF position. No forces are then generated by oil pressure to push the separator plates to the left (in FIG. 1), and the separator plates and the clutch discs are kept in a disengaged condition.

As described above, all the required operations are completed by the embodiment of the present invention. FIG. 4 is a table which summarizes the operation, states and purpose depending on the positions of the first and second oil pressure switching valve.

On the other hand, the elements required for the the embodiment of the present invention are fewer than those required for the prior art, as described below.

The prior art requires two separated frictional engagement devices, one for driving with engine power, the other for driving producing engine braking, but the present invention uses only one frictional engagement device for both situations.

Therefore, in the embodiment of the present invention, only three clutch discs are required, while in the prior art, five clutch discs are usually required, three for transmitting engine power and two for providing engine braking.

Similarly, in the embodiment of the present invention, only four separator plates are required, while in the prior art, usually seven separator plates are required, four for transmitting engine power and three for providing engine braking.

Similarly, in the embodiment of the present invention, only one spring is required, while in the prior art, usually two springs are required, one for release from driving under engine power and one for release from driving under engine braking.

Similarly, in the embodiment of the present invention, no check balls are required, while in the prior art, usually two check balls are required, one for release from driving under engine power and one for release from driving under engine braking.

In the embodiment of the present invention no oil accumulators are required, while two oil accumulators are usually required in the prior art, one for driving under engine power and one for driving under engine braking, because in the present invention engagement is performed with less force at the beginning, as explained in the description of the required operation (1).

As described before, the embodiment of the present invention does not require a one-way clutch of the sprag or roller type.

Therefore, an automatic transmission comprising the frictional engagement device according to the present invention can save the space used for one frictional engagement device, and also can eliminate the space for a one-way clutch of the sprag or roller type.

Also, the space for oil accumulators can be eliminated, if the axial lengths of oil passages are so made that engagement is performed with less strong force at the beginning.

Consequently, an automatic transmission comprising the frictional engagement device according to the present invention can be smaller and lighter than the prior art.

I claim:

1. A frictional engagement device in an automatic transmission having a first member and a second member which may be engaged and disengaged by use of oil pressure, said frictional engagement device comprising:

a casing connected to said first member and having at least one first oil passage;

a first piston means disposed in said casing and having at least one second oil passage, said first piston means defining a first oil pressure chamber together with said casing, said second oil passage being connected to said first oil pressure chamber, said first piston means being axially movable relative to said casing by a predetermined distance by supplying pressurized oil into said first oil pressure chamber, and one of said first piston means and said casing being rotationally movable relative to the other by a predetermined angle;

a second piston means disposed in said first piston means, said second piston means defining a second oil pressure chamber together with said first piston means, said second piston means being axially movable relative to said first piston means by supplying pressurized oil into said second oil pressure chamber;

first group of frictional engagement elements being axially spaced and axially slidably connected to said first piston means; and second group of frictional engagement elements being axially spaced and axially slidably connected to said second member, said second groups of frictional engagement elements facing said first groups of frictional engagement elements respectively, wherein said second piston means pushes one of said first group of frictional engagement elements and said second group of frictional engagement elements when said second piston means is axially moved by supplying pressurized oil into at least one of said first oil pressure chamber and said second oil pressure chamber, wherein said first oil passage in said casing is connected to said second oil passage in said first piston means and pressurized oil supplied in said first oil pressure chamber can be discharged when one of said casing and said first piston means rotationally moves relative to the other after said first piston means is axially moved.

2. A frictional engagement device in an automatic transmission according to claim 1, wherein a part of said first group of engagement elements and a part of said second group of engagement elements engage each other when pressurized oil is supplied only to said second oil pressure chamber, and all of said first engagement elements and all of said second engagement elements engaged when pressurized oil is supplied to said first oil pressure chamber.

3. A frictional engagement device in an automatic transmission according to claim 1, wherein those elements in said first group of engagement elements which are distant from said second piston means are blocked and cannot move farther when pressurized oil is supplied only to said second oil pressure chamber.

4. A frictional engagement device in an automatic transmission according to claim 1, wherein said first oil passage of said casing and said second oil passage of said first piston means connect to each other and pressurized oil in said first oil pressure chamber can be discharged, when one of said first piston means and said casing is rotationally moved relative to the other after said first piston means is axially fully moved by supplying pressurized oil to said first oil pressure chamber.

5. A frictional engagement device in an automatic transmission according to claim 1, wherein said first oil passage of said casing and said second oil passage of said first piston means connect to each other and pressurized oil in said first oil pressure chamber can be discharged, when one of said first piston means and said casing is rotationally moved relative to the other before said first piston means is axially fully moved by supplying pressurized oil to said first oil pressure chamber.

6. A frictional engagement device in an automatic transmission according to claim 1, wherein said second piston means is urged by a spring means in the opposite direction to the direction of the force generated by supplying pressurized oil into at least one of said first oil pressure chamber and said second oil pressure chamber.

7. A frictional engagement device in an automatic transmission according to claim 1, wherein the axial length of the opening at the inner peripheral mating surface of said first oil passage of said casing and the axial length of the opening at the outer peripheral mating surface of said second oil passage of said first piston means, are identical.

8. A frictional engagement device in an automatic transmission according to claim 7, wherein said opening at the inner peripheral mating surface of said first oil passage of said casing and the opening at the outer peripheral mating surface of said second oil passage of said first piston means respectively have an area sufficiently small that pressurized oil in said first oil pressure chamber cannot be discharged therefrom until the first piston has moved by said predetermined distance.

\* \* \* \* \*